United States Patent [19]

Seamans et al.

[11] Patent Number: 5,688,736
[45] Date of Patent: *Nov. 18, 1997

[54] METHOD OF PRESULFURIZING A HYDROTREATING, HYDROCRACKING OR TAIL GAS TREATING CATALYST

[75] Inventors: James Dallas Seamans, Woodlands; Charles Terrell Adams, Houston; Wendy Beth Dominguez, Rosenberg; Andrew An-Ju Chen, Houston, all of Tex.

[73] Assignee: CRI International, Inc., Houston, Tex.

[*] Notice: The term of this patent shall not extend beyond the expiration date of Pat. No. 5,215,954.

[21] Appl. No.: 548,570

[22] Filed: Oct. 26, 1995

Related U.S. Application Data

[60] Continuation of Ser. No. 166,135, Dec. 13, 1993, Pat. No. 5,468,372, which is a division of Ser. No. 969,660, Oct. 30, 1992, Pat. No. 5,292,702, which is a continuation of Ser. No. 737,630, Jul. 30, 1991, Pat. No. 5,215,954.

[51] Int. Cl.$^6$ ..................................... B01J 27/04
[52] U.S. Cl. ................... 502/219; 502/150; 502/216; 502/220; 502/221; 502/223; 502/222; 208/112
[58] Field of Search ..................... 502/219–222, 502/216, 223; 208/112

[56] References Cited

U.S. PATENT DOCUMENTS

| | | | |
|---|---|---|---|
| 2,038,599 | 4/1936 | Pier et al. | 196/53 |
| 3,383,301 | 5/1968 | Beuther et al. | 208/216 |
| 3,872,028 | 3/1975 | Rijnten et al. | 252/439 |
| 4,089,930 | 5/1978 | Kittrell et al. | 502/220 |
| 4,177,136 | 12/1979 | Herrington et al. | 208/215 |
| 4,368,141 | 1/1983 | Kukes | 502/601 |
| 4,431,747 | 2/1984 | Seiver et al. | 502/222 |
| 4,530,917 | 7/1985 | Berrebi | 502/220 |
| 4,548,920 | 10/1985 | Thompson et al. | 502/219 |
| 4,672,049 | 6/1987 | Chen et al. | 502/66 |
| 4,943,547 | 7/1990 | Seamans et al. | 502/150 |
| 5,041,404 | 8/1991 | Seamans et al. | 502/150 |
| 5,051,389 | 9/1991 | Lang et al. | 502/185 |
| 5,053,376 | 10/1991 | Bearden, Jr. et al. | 502/150 |
| 5,215,954 | 6/1993 | Seamans et al. | 502/219 |
| 5,292,702 | 3/1994 | Seamans et al. | 502/219 |
| 5,468,372 | 11/1995 | Seamans et al. | 208/216 R |

FOREIGN PATENT DOCUMENTS 759938  5/1967  Canada.

*Primary Examiner*—Helane Myers

[57] ABSTRACT

The invention relates to an improved method of presulfurizing a sulfidable metal oxide(s)-containing catalyst which minimizes sulfur stripping upon start-up of a reactor and improves catalyst activity. The method consists of contacting a sulfidable metal oxide(s)-containing catalyst with elemental sulfur at a temperature such that said elemental sulfur is substantially incorporated in the pores of said catalyst by sublimation and/or melting and heating the sulfur-incorporated catalyst in the presence of a liquid olefinic hydrocarbon at a temperature greater than about 150° C.

20 Claims, No Drawings

METHOD OF PRESULFURIZING A HYDROTREATING, HYDROCRACKING OR TAIL GAS TREATING CATALYST

This is a continuation of application Ser. No. 08/166,133, filed Dec. 13, 1993, now U.S. Pat. No. 5,468,372, which is a division of Ser. No. 07/969,660, filed Oct. 30, 1992, now U.S. Pat. No. 5,292,702, which is a continuation of Ser. No. 07/737,630, filed Jul. 30, 1991, now U.S. Pat. No. 5,215,954.

FIELD OF THE INVENTION

This invention relates to a method of presulfurizing a supported metal oxide catalyst for use in hydrotreating and/or hydrocracking hydrocarbon feed stocks or in treating sulfur-containing effluent gas streams, the presulfurized catalyst composition resulting from such method and a hydrotreating and/or hydrocracking process or tail gas treating process utilizing such presulfurized metal oxide catalyst.

BACKGROUND OF THE INVENTION

A hydrotreating catalyst may be defined as any catalyst composition which may be employed to catalyze the hydrogenation of hydrocarbon feedstocks, and most particularly to hydrogenate particular components of the feed stock, such as sulfur-, nitrogen- and metals-containing organo-compounds and unsaturates. A hydrocracking catalyst may be defined as any catalyst composition which may be employed to crack massive and complex petroleum derived molecules to attain smaller molecules with the concomitant addition of hydrogen to the molecules. A tail gas catalyst may be defined as any catalyst which may be employed to catalyze the conversion of hazardous effluent gas streams to less harmful products, and most particularly to convert oxides of sulfur to hydrogen sulfide which can be recovered and readily converted to elemental sulfur.

Catalyst compositions for hydrotreating and/or hydrocracking or tail gas treating are well known to those of ordinary skill in the art and several are commercially available. Metal oxide catalysts which come within this definition include cobalt-molybdenum, nickel-tungsten, and nickel-molybdenum supported usually on alumina, silica and silica-alumina, including zeolite, carriers. Also, transition element catalysts may be employed for these purposes. In general catalysts comprising at least one element selected from V, Cr, Mn, Re, Co, Ni, Cu, Zn, Mo, W, Rh, Pd, Pt, Ag, Au, Cd, Sn, Sb, Bi and Te have been disclosed as suitable for these purposes.

For maximum effectiveness the metal oxide catalysts are converted at least in part to metal sulfides. The metal oxide catalysts can be sulfided in the reactor by contact at elevated temperatures with hydrogen sulfide or a sulfur-containing oil or feed stock. However, it is advantageous to the user to be supplied with metal oxide catalysts having sulfur incorporated therein. These presulfurized catalysts can be loaded into a reactor and brought up to reaction conditions in the presence of hydrogen causing the sulfur to react with hydrogen and the metal oxides thereby converting them into sulfides without any additional process steps being needed. These presulfurized catalysts provided an economic advantage to the plant operator and avoid many of the hazards such as flammability and toxicity, which are encountered when using hydrogen sulfide, liquid sulfides, polysulfides and/or mercaptans to sulfide the catalysts.

The use of high boiling oils, such as vacuum gas oils, and hydrocarbon solvents to aid the incorporation of sulfur into a catalyst is taught in U.S. Pat. No. 4,943,547, issued Jul. 24, 1990.

Hydrotreating catalysts have been presulfurized by incorporating sulfur compounds into the porous catalyst prior to hydrotreating a hydrocarbon feedstock. For example, U.S. Pat. No. 4,530,917, issued Jul. 23, 1985, to Berrebi discloses a method of presulfurizing a hydrotreating catalyst with organic polysulfides.

U.S. Pat. No. 4,117,136, issued Dec. 4, 1979, to Herrington et al discloses a method of catalyst presulfurizing wherein a catalyst is treated with elemental sulfur. Hydrogen is then used as a reducing agent to convert the elemental sulfur to hydrogen sulfide in situ.

U.S. Pat. No. 4,089,930, issued May 16, 1978, to Kittrell et al discloses the pretreatment of a catalyst with elemental sulfur in the presence of hydrogen.

Prior art ex-situ methods of presulfurizing supported metal oxide catalysts have suffered from excessive stripping of sulfur upon start-up of a hydrotreating reactor in the presence of a hydrocarbon feedstock. As a result of sulfur stripping, a decrease in catalyst activity or stability is observed.

OBJECTS OF THE INVENTION

It is an object of the present invention to presulfurize a hydrotreating and/or hydrocracking or tail gas treating catalyst in a manner which minimizes sulfur stripping upon start-up of a hydrotreating and/or hydrocracking or tail gas treating reactor.

It is yet a further object of the present invention to prepare a safe, stable, presulfurized hydrotreating and/or hydrocracking or tail gas treating catalyst, either fresh or regenerated.

It is yet a further object of the present invention to provide a presulfurized hydrotreating and/or hydrocracking or tail gas treating catalyst that upon activation in-situ provides a highly active hydrotreating and/or hydrocracking or tail gas treating catalyst.

It is yet a further object of the present invention to provide a presulfurized hydrotreating and/or hydrocracking or tail gas treating catalyst that can be started up rapidly.

SUMMARY OF THE INVENTION

The present invention relates to an improved method of presulfurizing a sulfidable metal oxide(s)-containing catalyst which minimizes sulfur stripping upon start-up of a reactor and improves catalyst activity. The method is particularly suitable for application to hydrotreating and/or hydrocracking or tail gas treating catalysts. The catalyst is typically presulfurized by one of two methods.

The first method comprises contacting a sulfidable metal oxide(s)-containing catalyst with elemental sulfur at a temperature such that said elemental sulfur is substantially incorporated in the pores of said catalyst by sublimation and/or melting and subsequently heating the sulfur-incorporated catalyst in the presence of a liquid olefinic hydrocarbon at a temperature greater than about 150° C.

The second method comprises contacting a sulfidable metal oxide(s)-containing catalyst with a mixture of powdered elemental sulfur and a liquid olefinic hydrocarbon and heating the resultant mixture to a temperature above about 150° C.

DESCRIPTION OF THE PREFERRED EMBODIMENTS

According to the present invention porous catalyst particles are contacted with elemental sulfur under conditions which cause the sulfur to be incorporated into the pores of the catalyst by sublimation, by melting or by a combination of both sublimation and melting. The sulfur-incorporated catalyst particles are contacted with a liquid olefin at elevated temperatures and times sufficient to cause the sulfur-incorporated catalyst particles to have enhanced resistance to sulfur stripping during startup in a hydrotreating and/or hydrocracking reactor in the presence of a hydrocarbon feedstock. Also, when such olefinically treated presulfurized catalysts are used for tail gas treating, they can be started up more rapidly than conventional catalysts.

The mechanism by which the heating of the sulfur-incorporated catalyst becomes more resistant to sulfur stripping upon heating at elevated temperatures in the presence of the olefin is not known and will be referenced herein as "reaction" or "reacts" for lack of better terminology. In any event, the result of this mechanism can readily be determined without undue experimentation by measuring the resistance to sulfur stripping of catalysts subjected to differing temperature/time treatments with the olefin and without the olefin and measuring the resistance to sulfur stripping of the resulting catalysts. Catalysts falling within the scope of the instant invention will have enhanced resistance to sulfur stripping. A suitable method for determining sulfur stripping resistance is described in the Illustrative Embodiment below wherein acetone is used as a stripping agent.

The catalysts referred to herein as "sulfidable metal oxide(s) catalysts" can in fact be catalyst precursors, that is, they are used as actual catalysts while in the sulfided form and not in the oxide form. While reference is made to metal oxide(s) catalysts, it is understood that while the normal catalyst preparative techniques will produce metal oxide(s), it is possible to utilize special preparative techniques to produce the catalytic metals in a reduced form, such as the zero valent state. Since metals in the zero valent state will be sulfided as well as the oxides when subjected to sulfiding conditions, catalysts containing such sulfidable metals even in reduced or zero valent states will be considered for the purposes of this invention as sulfidable metal oxide(s) catalysts. Further, since the preparative technique of the instant invention can be applied to regenerated catalysts which may have the metal sulfide not completely converted to the oxides, "sulfidable metal oxide(s) catalysts" also refers to these catalysts which have part of their metals in the sulfided state.

There are two general methods used to carry out the process of the instant invention although other more or less equivalent methods will occur to one skilled in the art and are intended to be included within the scope of the invention.

The first and preferred method comprises contacting a porous sulfidable metal oxide(s)-containing catalyst with elemental sulfur at a temperature such that said elemental sulfur is substantially incorporated in the pores of said catalyst by sublimation and/or melting and subsequently heating the sulfur-incorporated catalyst in the presence of a liquid olefinic hydrocarbon at a temperature greater than about 150° C.

The second method comprises contacting a porous sulfidable metal oxide(s)-containing catalyst with a mixture of powdered elemental sulfur and a liquid olefinic hydrocarbon and heating the resultant mixture to a temperature above about 150° C. In this procedure the heating rate is sufficiently slow such that the sulfur is incorporated into the pores of said catalyst by sublimation and/or melting prior to reaching the temperature at which the olefin reacts to make the sulfur more resistant stripping.

In the preferred embodiment the porous catalyst particle is first contacted with elemental sulfur at a temperature such that the sulfur is incorporated into the catalyst by sublimation and/or melting. While the catalyst particles can be contacted with sulfur in the molten state, it is preferred to first admix the catalyst particles with powdered elemental sulfur and then heat the mixture to above the temperature at which sublimation of the sulfur occurs.

Generally the catalyst particles are heated in the presence of the powdered elemental sulfur at a temperature greater than about 80° C. Preferably this first sulfur impregnation step will be carried out at a temperature ranging from about 90° C. to about 130° C. or higher, say up to the boiling point of sulfur of about 445° C. The lower temperature limit is fixed by the sublimation/melting characteristics of sulfur under the specific conditions of impregnation, whereas the upper temperature limit is fixed primarily by economics, higher temperatures being more costly to produce as well as more difficult to work with.

In a preferred embodiment the catalyst and sulfur are heated together at a temperature ranging from about 105° C. to about 125° C. Typically the catalyst and powdered sulfur are placed in a vibratory or rotary mixer and heated to the desired temperature for sufficient time to allow the sulfur to be incorporated into the pores of the catalyst. Times typically will range from about 0.1 hour to about 10 hours or longer.

The amounts of sulfur used in the instant process will depend upon the amounts of catalytic metal present in the catalyst that needs to be converted to the sulfide. Typically the amount of sulfur used is determined on the basis of the stoichiometric amount of sulfur required to convert all of the metal on the catalyst to the sulfide form. For example a catalyst containing molybdenum would require two moles of sulfur to convert each mole of molybdenum to molybdenum disulfide, with similar determinations being made for other metals. On regenerated catalysts, existing sulfur levels may be factored into the calculations for the amounts of elemental sulfur required.

It has been found that the addition of presulfurizing sulfur in amounts down to about 50 percent of the stoichiometric requirement results in catalysts having enhanced hydrodenitrification activity, which is an important property of hydrotreating and first stage hydrocracking catalysts. Thus, the amount of presulfurizing sulfur used for incorporation into the catalyst will typically range from about 0.5 to about 1.5 times the stoichiometric amount, and preferably from about 0.7 to about 1.2 times the stoichiometric amount.

For hydrotreating/hydrocracking and tail gas treating catalysts containing Group VIB and/or Group VIII metals the amount of sulfur employed is typically about 2 to about 15% by weight of the catalyst charged, and most preferably, the amount of sulfur employed is about 6% to about 12% by weight of the catalyst charged. It is preferred not to add so much sulfur to the catalyst that the pores are completely filled up. By leaving residual pore volume, the olefin can penetrate the pores and react therein.

The key step to the instant invention is to contact the sulfur impregnated metal catalyst with a liquid olefin at an elevated temperature and for sufficient time at temperature such that the olefin reacts and provides a sulfurized catalyst that is more resistant to sulfur leaching than one not contacted with an olefin. Typically the contact temperature is greater than about 150° C. and typically will range from about 150° C. to about 350° C., preferably from about 200° C. to about 325° C. Contact times will depend on temperature and the vapor pressure of the olefin, higher temperatures and higher vapor pressures requiring shorter times. In general times will range from about 0.1 hour to about 10 hours.

The key property of the olefin is that it must be a liquid at the elevated temperature of contact. It is preferred that the olefin be a higher olefin, i.e., one having a carbon number greater than six, preferably greater than eight. The upper carbon number of useful olefins is determined by the melting point of the olefin in question. While waxy olefinic materials having carbon numbers around 60 can be used, they are inconvenient since they must be heated to such a high temperature in order to be converted into a liquid, although they can be used with a solvent to put them in liquid form. Olefins with carbon numbers ranging from about 6 to about 30, preferably from about 8 to about 25 are found most useful.

The term "olefin" as used herein refers to hydrocarbon molecules containing at least one carbon-carbon double bond and will include hydrocarbons containing at least one carbon-carbon double bond in addition to other functional moieties, such as, for example, carboxylate, halo, etc, provided such additional moieties do not adversely react with the catalytic metals on the catalyst. The olefins may be monoolefins or polyolefins, cyclic or acyclic, linear or branched. Non-limiting examples of monoolefins include decone, undecene, dodecene, tridecene, tetradecene, pentadecene, hexadecene, heptadecene, octadecene, nonadecene, eicosene, and the like, whether branched, linear or cyclic, alpha or internal olefin. Similar materials in the form of di-, tri- and polyolefins may be used. Polycyclic olefins and polyolefins may also be used. The readily available compound dicyclopentadiene is found useful.

The olefins may also be admixed with non-olefinic hydrocarbons, such as alkanes or aromatic solvents. In general, the olefin content of any olefin-containing hydrocarbon used in the process of the instant invention should be above about 5% wt., preferably above about 10% wt., and most preferably above about 30% wt. Generally, higher olefin contents are used, say, above about 50% wt, and most conveniently the olefin is used in the undiluted form. The term "olefinic hydrocarbon" as used herein refers to a hydrocarbon that contains olefinic molecules with or without the presence of non-olefinic molecules. It is understood that the olefins may be provided as olefin precursors which are converted to olefins before or upon reaching the reaction temperature.

The minimum amounts of olefins to be used should be such that upon reaction at elevated temperature, a catalyst is obtained that has reduced sulfur leaching properties. The maximum amounts of olefin used are determined primarily by economics. In a preferred embodiment the amount of olefinic hydrocarbon is used that will just fill the pore volume of the sulfur impregnated catalyst or just slightly less, down to about 60 percent, preferably down to about 80 percent of the pore volume. A preferred target range is from about 80 to about 95 percent of the pore volume. In this manner, the treated catalyst will be "dry" and is more convenient to handle.

In another embodiment according to the present invention, the catalyst particles are contacted with both the elemental sulfur, preferably powdered, and the olefinic hydrocarbon simultaneously. According to this method, a mixture of powdered elemental sulfur and olefinic hydrocarbon solvent is first produced. A ratio of oil to sulfur by weight ranging from about 1:1 to about 4:1 is suitable, with about 2:1 being a preferred ratio. The mixture may be heated to promote homogenous mixing of the components, particularly if the olefinic hydrocarbon is not liquid at ambient conditions. Toluene or other light weight hydrocarbon solvents may be added to decrease the viscosity of the mixture. Also, increased heat will achieve the same effect. The mixture is then added to a preweighed catalyst sample and mixed. The mixture is then heated to the olefin reaction temperature of above about 150° C. Preferably the temperature ranges from about 150° C. to about 350° C. and more preferably from about 200° C. to about 325° C. The times are the same as in the preferred two-step embodiment described above, that is from about 0.1 to about 10 hours. During the heating process the sulfur first impregnates the pores of the catalyst and then the olefin reacts to form the sulfur leaching resistant catalyst.

The presulfurized catalyst of the instant invention may be converted to sulfided catalysts by contact with hydrogen at temperatures greater than about 200° C., preferably ranging from about 200° C. to about 425° C. Times can run from about 0.5 hours to up to 3 days.

In preferred operation the presulfurized catalyst of the instant invention is loaded into a hydrotreating and/or hydrocracking reactor or tail gas reactor and hydrogen flow is started to the reactor and the reactor is heated up to operating (hydrotreating and/or hydrocracking or tail gas treating) conditions. In the presence of hydrogen, activation of the catalyst takes place. That is, the metal oxides and hydrogen react with substantially all of the sulfur incorporated into the catalyst pores, thus producing hydrogen sulfide, water and metal sulfides. In the hydrotreating and/or hydrocracking process, a hydrocarbon feedstock flow may be started simultaneously with the hydrogen or later.

The process of the present invention is further applicable to the sulfurizing of spent catalysts which have been oxy-regenerated. After a conventional oxy-regeneration process, an oxy-regenerated catalyst may be presulfurized as would fresh catalyst in the manner set forth above and specifically in a manner set forth by way of the following examples.

The instant invention is also intended to encompass a method for stabilizing (enhancing the resistance to sulfur leaching) a supported metal catalyst containing elemental sulfur, particularly a Group VIB and/or Group VIII metal catalyst, by contacting said catalyst with an olefinic hydrocarbon at a temperature greater than about 150° C.

The presulfurizing process is particularly suitable for application to hydrotreating and/or hydrocracking or tail gas treating catalysts. These catalysts typically comprise Group VIB and/or Group VIII metals supported on porous supports such as alumina, silica, silica-alumina, zeolite and the like. The materials are well defined in the art and can be prepared by techniques described therein, such as in U.S. Pat. No. 4,530,911, issued Jul. 23, 1985 and U.S. Pat. No. 4,520,128, issued May 28, 1985, both incorporated by reference herein. Preferred hydrotreating and/or hydrocracking or tail gas treating catalysts will contain a group VIB metal selected from molybdenum, tungsten and mixtures thereof and a Group VIII metal selected from nickel, cobalt and mixtures thereof supported on alumina. Versatile hydrotreating and/or hydrocracking catalysts which show good activity under various reactor conditions are alumina-supported nickel-molybdenum and cobalt-molybdenum catalysts. Phosphorous is sometimes added as a promoter. A versatile tail gas treating catalyst which shows good activity under various reactor conditions is an alumina-supported cobalt-molybdenum catalyst.

Hydrotreating catalysts which are specifically designed for hydrodenitrification operations, such as alumina-supported nickel-molybdenum catalysts, presulfurized by the methods described herein have higher initial activities, particularly hydrodenitrification activities, than catalysts sulfided by prior art methods. This higher initial activity, coupled with ability to avoid sulfiding in the presence of hydrogen sulfide, provides the instant presulfurized catalysts with a significant commercial advantage. It allows the hydrotreating and/or hydrocracking reactor to get into full operation quicker, and, once at operating conditions, have a higher activity, allowing the reactor to be operated at either lower temperature or higher conversion. Tail gas treating reactors can also be started up more quickly.

Thus, the instant invention relates to an improved process for starting up a hydrotreating and/or hydrocracking reactor, which comprises loading the catalyst presulfurized according to the methods described herein into the reactor and heating the reactor to operating conditions in the presence of hydrogen and optionally a hydrocarbon feedstock. The invention also comprises an improved hydrotreating and/or hydrocracking process which comprises contacting at hydrotreating and/or hydrocracking conditions a hydrocarbon feedstock and hydrogen with a catalyst which has been presulfurized according to the methods taught herein and which has been heated to hydrotreating and/or hydrocracking temperature in the presence of hydrogen and optionally a hydrocarbon feedstock.

Hydrotreating conditions comprise temperatures ranging from about 100° C. to about 425° C., pressures above about 40 atmospheres. The total pressure will typically range from about 400 to about 2500 psig. The hydrogen partial pressure will typically range from about 200 to about 2200 psig. The hydrogen feed rate will typically range from about 200 to about 10000 standard cubic feet per barrel ("SCF/BBL"). The feedstock rate will typically have a liquid hourly space velocity ("LHSV") ranging from 0.1 to about 15.

Hydrocracking conditions comprise temperatures ranging from about 300° C. to about 500° C., pressures above about 40 atmospheres. The total pressure will typically range from about 400 to about 3000 psig. The hydrogen partial pressure will typically range from about 300 to about 2600 psig. The hydrogen feed rate will typically range from about 1000 to about 10,000 standard cubic feet per barrel ("SCF/BBL"). The feedstock rate will typically have a liquid hourly space velocity ("LHSV") ranging from 0.1 to about 15. First stage hydrocrackers, which carry out considerable hydrotreating of the feedstock may operate at higher temperatures than hydrotreaters and at lower temperatures than second stage hydrocrackers.

Tail gas treatment reactors typically operate at temperatures ranging from about 200° C. to about 400° C. and at atmospheric pressure. About 0.5–5% vol. of the tail gas fed to the reactor will comprise hydrogen. Standard gaseous hourly space velocities of the tail gas through the reactor will range from about 500 to about 10,000 hr$^{-1}$. There are several ways the subject catalysts can be started up in a tail gas treatment reactor. Claus unit feed or tail gas can be used to start up the subject catalysts. Supplemental hydrogen, as required, may be provided by a gas burner operating at a substoichiometric ratio in order to produce hydrogen.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes and are not to be construed as limiting the invention.

ILLUSTRATIVE EMBODIMENT I

Presulfurization Method

Part A: Sulfur impregnation

A commercial hydrotreating catalyst having the properties listed below was used to prepare the sulfurized catalysts.

TABLE 1

| Catalyst Properties | |
|---|---|
| Nickel | 2.6% wt |
| Molybdenum | 14.3% wt |
| Phosphorous | 2.9% wt |
| Support | gamma alumina |
| Surface Area, m$^2$/g | 164 |
| Water Pore Vol., cc/g | 0.44 |
| Size | 1/20 inch trilobes |

A 430 gram sample of the above sample was dried at 370° C. for one hour and then cooled to ambient under vacuum. The sample was then placed in a flask and enough sulfur, in powdered form, was added to produce a sulfur level of about 10% by weight. The flask was provided with a slow nitrogen purge and placed in a heating mantle at 107° C. for 1 hour. During this time period the flask was vibrated continually to provide mixing of sulfur and catalyst. The final sulfur level was about 10.5% by weight of the total catalyst. The water pore volume of the sulfur-impregnated catalyst was determined to be about 0.3 cc/g.

Part B: Olefin Reaction

The sulfur-impregnated catalyst from Part A was impregnated with the various hydrocarbons listed in Table 2. The catalyst was impregnated with hydrocarbon sufficient to fill 90% of the pore volume. The eicosane, vacuum gas oil ("VGO") and the $C_{20}$ olefin, being solids or semi-solids at room temperature, were heated to 40° C. before being applied to the catalyst. All other hydrocarbons were simply added to the catalyst. The catalyst was shaken with the hydrocarbon until the catalyst appeared dry. This took approximately 10 minutes per sample.

100 Grams of the hydrocarbon-containing catalyst were loaded into a quartz reactor tube and placed in a furnace. The reactor outlet was tubed to a liquid trap, then to a silicone oil-filled container to prevent air back-diffusion. Nitrogen flow was established to the reactor inlet at 230 cc/min, and the catalyst bed was purged of air for 30 minutes. The nitrogen flow was reduced to 30 cc/min for the duration of the heat treatment.

The reactor was heated to 205° C. over the course of one hour and held there for 3 hours. After heat treatment was complete, the reactor contents were cooled to room temperature under nitrogen purge. The samples were analyzed for sulfur content.

Part C: Sulfur Leaching Tests

Acetone was used as a extractive solvent for measuring the ability of the catalysts to resist sulfur leaching. Acetone is a more aggressive solvent for sulfur than the typical hydrotreating and/or hydrocracking feedstocks. Catalysts that are found to be resistant to sulfur leaching by acetone are also found to be resistant to leaching by hydrocarbon feedstocks and have thus acquired the benefits of the instant invention. Thus, the acetone extraction test as described herein can be used by one skilled in the art to determine if sulfur-leaching resistant catalysts as defined and claimed herein have been obtained.

A Soxhlet extractor was used in this test. The thimble of the extractor was filled with 20 cc of catalyst and the flask of the extractor was filled about ¾ full (about 600 cc) with acetone. The extractor was heated to the boiling point of acetone (57° C.) and allowed to reflux for 18 hours. After extraction, the flask was cooled, the catalyst removed and dried at 40° C. for 16 hours. The extracted catalysts were analyzed for sulfur content. The percent of sulfur retained after extraction is shown in table 2 below. This percent of retained sulfur is calculated as the amount of sulfur on the catalyst after the extraction of Part C divided by the sulfur in the catalyst after the heat treatment of Part B times 100%.

TABLE 2

Sulfur Leaching Results

| "Reactant" Hydrocarbon | Amount of Sulfur After Extraction |
|---|---|
| NEODENE ® 10 OLEFINS[a] | 92.2 |
| N-DECANE | 15.6 |
| NEODENE ® 14/16 OLEFINS[b] | 88.5 |
| N—$C_{14}/C_{16}$ BLEND | 30.6 |
| CHEVRON TETRAMER M[d] | 94.3 |
| CHEVRON POLYMER 560[e] | 88.5 |
| DIESEL FUEL | 77.1 |
| VACUUM GAS OIL | 85.2 |
| NEODENE ® 20 OLEFINS[f] | 96.4 |
| EICOSANE | 65.3 |

[a]An olefin product manufactured by Shell Chemical Co. whose composition is 96% wt. minimum $C_{10}$ alpha-monoolefin.
[b]An olefin product manufactured by Shell Chemical Co. whose composition is 94% wt. minimum alpha-monoolefin comprising 65% wt. $C_{14}$ alpha-monoolefin and 35% wt. $C_{16}$ alpha-monoolefin.
[c]A blend of normal $C_{14}$ and $C_{16}$ alkanes blended to have the same $C_{14}/C_{16}$ ratio as b) above.
[d]An olefin product manufactured by Chevron Chemical Co. which is a tetramer of propylene.
[e]An olefin product manufactured by Chevron Chemical Co. whose composition is $C_{12}$–$C_{18}$ branched monoolefins.
[f]An olefin product manufactured by Shell Chemical Co. whose composition is 94% wt. minimum $C_{20}$ alpha-monoolefin.

ILLUSTRATIVE EMBODIMENT II

Use of Presulfurized Catalyst in Hydrotreating Process

Six types of catalysts, two comparative and four of this invention, were used to demonstrate the advantages of the instant invention as applied to a hydrotreating process. These were:

1) COMP Catalyst—This is the commercial hydrotreating catalyst listed in Table 1 which has been sulfided by an industry accepted sulfiding method using hydrogen and hydrogen sulfide as it is described below.

2) $A_{100}$ Catalyst—This is a catalyst prepared as described in Illustrative Embodiment I with 100% stoichiometric sulfur and using the normal $C_{14}/C_{16}$ olefin blend described in Table 2 as one treating hydrocarbon.

3) $A_{75}$ Catalyst—This is a catalyst prepared as described in Illustrative Embodiment I with 75% stoichiometric sulfur and using the normal $C_{14}/C_{16}$ olefin blend described in Table 2 as the treating hydrocarbon.

4) $A_{50}$ Catalyst—This is a catalyst prepared as described in Illustrative Embodiment I with 50% stoichiometric sulfur and using the normal $C_{14}/C_{16}$ olefin blend described in Table 2 as the treating hydrocarbon.

5) $COMP_{C14/16}$ Catalyst—This is a comparative catalyst prepared as described in Illustrative Embodiment I with 100% stoichiometric sulfur and using the normal-$C_{14}/C_{16}$ alkane blend described in Table 2 as the treating hydrocarbon.

6) $A_{C14/16}$ Catalyst—This is a catalyst prepared as described in Illustrative Embodiment I with 100% stoichiometric sulfur and using the normal-$C_{14}/C_{16}$ olefin blend described in Table 2 as the treating hydrocarbon. This catalyst is substantially similar to the $A_{100}$ catalyst except the $A_{100}$ catalyst was a large scale preparation and this was a laboratory scale preparation.

Microreactors were utilized to test the hydrotreating activity of the catalysts. The catalysts were loaded into the reactor as follows: 30 cc of catalyst (basis compacted bulk density) was divided into 3 aliquots. The first aliquot contained 2.5 cc of catalyst and was diluted 10:1 (SiC to catalyst) with 60/80 mesh SiC. The remaining two aliquots contained 13.75 cc of catalyst each and were diluted 1:1 with 60/80 mesh SiC. These aliquots were loaded into the reactor tube with the dilute one on top (the inlet end).

Part A: Short Term Activity Tests

A blend of vacuum gas oil and light cycle oil (VGO/LCO) was used as feedstock and had the following properties:

| % wt Sulfur | 1.7 |
|---|---|
| ppm Nitrogen | 1120 |
| Refractive Index | 1.5183 (25° C.) |
| Density | 0.9242 (60° F.) |

1) COMP Catalyst Activation

The COMP Catalyst was dried at 400° C. for one hour in air, cooled in a desiccator and loaded into the reactor, It was sulfided in a flow of 45 Nl/hr of 95% vol hydrogen/5% vol hydrogen sulfide according to the following schedule:

a. ambient to 121° C. at 5.6° C./min
b. 121° C. to 204° C. at 0.56° C./min
c. hold at 204° C. for 90 min
d. heat from 204° C. to 371° C. at 1.1° C./min
e. hold at 371° C. for 60 min
f. cool reactor and hold at 149° C.

2) Diesel Activation

This method was used to activate catalysts of this invention using a diesel refined for cars and trucks and was as follows:

a. Unit was pressurized to 700 psig and hydrogen circulation was established at 1000 SCF/BBL (8 Nl/hr),
b. Diesel feed was started to the catalyst bed at 1.5 LHSV and ambient temperature.
c. The reactor temperature was raised to 121° C. in one hour, then increased to 343° C. at 27.8° C./hour. Temperatures were held at 343° C. for 30 minutes.
d. Since the temperature ramp occurred overnight, the reactor was also cooled overnight at 149° C. for feed switch in the morning.

3) Gas Activation

This method was used to activate catalysts of this invention using first hydrogen, followed by diesel, and simulates the startup of certain commercial hydrotreaters. This method is as follows:

a. Unit was pressurized to 300 psig and hydrogen circulation was established at 1000 SCF/BBL (8 Nl/hr).
b. Temperature was ramped from ambient to 121° C. at 27.8° C./hr.
c. Temperature was ramped from 121° C. to 204° C. in one hour. Off gas was sampled for $H_2S$ during period.

d. When 204° C. was reached, unit was pressured to 700 psig and held for one hour.

e. Diesel feed (same as in 2) above) was introduced at 204° C.

f. The temperature was ramped to 260° C. at 27.8° C./hr and the unit cooled to 149° C. with diesel feed continuing overnight.

4) Activity Testing

For activity testing the unit was pressured up to 700 psig and heated to 246° C. with a hydrogen gas rate of 1000 SCF/bbl (8 Nl/hr). The VGO/LCO feed was started to the unit at 1.5 LHSV (41.6 gm/hr). After the feed had wetted the entire bed (and product was noted in the separator), the temperature was raised to 329° C. at 22.2° C./hr.

After the reactor was at 329° C., a 12 hour break-in period was begun. The product from this period was not analyzed. The run was continued with additional weight periods of 12 hours and the products of each weight period were analyzed for nitrogen and sulfur. From these values rate constants were calculated for the hydrodenitrification ("HDN") reaction and the hydrodesulfurization ("HDS") reaction. Rate constants provide an indication of how active the catalyst is, the higher the rate constant, the faster the reaction process, and the higher the conversion of sulfur and nitrogen at a given space velocity (feed rate). For HDN the reaction order is 1.0 and the k value is calculated by the equation $$k = (\text{space velocity}) * \ln\left\{\frac{\text{conc. of } N \text{ in feed}}{\text{conc. of } N \text{ in product}}\right\}$$

For HDS the reaction is not first order and many values are used, but 1.7 is the value most used and is used herein to calculate as follows:

$$R = \left\{\frac{\text{space velocity}}{1.7 - 1}\right\} \left\{\frac{1}{(\text{conc. of } S \text{ in product})^{0.7}} - \frac{1}{(\text{conc. of } S \text{ in feed})^{0.7}}\right\}$$

The relative rate constants are provided in Table 3. The have been normalized against the values for the third weight period for the COMP Catalyst.

TABLE 2

Short Term Activity Tests

| Catalyst | Activation | Weight Period (12 hrs each) | HDS Rel. K Value | HDN Rel. K Value |
|---|---|---|---|---|
| COMP | 1) Standard | 3rd | 1.00 | 1.00 |
| A$_{100}$ | 3) Gas | 3rd | 1.01 | 1.19 |
|  |  | 4th | 1.01 | 1.15 |
|  |  | 5th | 0.98 | 1.09 |
|  |  | 6th | 1.00 | 1.12 |
| A$_{100}$ | 2) Diesel | 3rd | 0.98 | 1.17 |
|  |  | 4th | 0.98 | 1.17 |
|  |  | 5th | 0.97 | 1.11 |
|  |  | 6th | 1.00 | 1.13 |
|  |  | 7th | 0.99 | 1.11 |
| A$_{75}$ | 2) Diesel | 3rd | 1.04 | 1.23 |
|  |  | 4th | 1.04 | 1.22 |
|  |  | 5th | 1.05 | 1.22 |
|  |  | 6th | 1.05 | 1.22 |
| A$_{50}$ | 2) Diesel | 3rd | 0.92 | 1.13 |
|  |  | 4th | 0.90 | 1.10 |
|  |  | 5th | 0.90 | 1.08 |
| COMP$_{C14/16}$ | 2) Diesel | 3rd | 0.76 | 1.07 |
|  |  | 4th | 0.76 | 1.05 |
|  |  | 5th | 0.74 | 1.03 |

TABLE 2-continued

Short Term Activity Tests

| Catalyst | Activation | Weight Period (12 hrs each) | HDS Rel. K Value | HDN Rel. K Value |
|---|---|---|---|---|
|  |  | 6th | 0.72 | 0.87 |
| A$_{C14/16}$ | 2) Diesel | 3rd | 0.93 | 1.18 |
|  |  | 4th | 0.91 | 1.16 |
|  |  | 5th | 0.91 | 1.14 |
|  |  | 6th | 0.92 | 1.16 |

As can be seen from the above table the catalysts of this invention show a clear advantage over a traditional hydrotreating catalyst with regard to hydrodenitrification activity.

Part B: Long Term Activity Tests

COMP Catalyst and A$_{100}$ Catalyst were used in long term tests to measure HDN activity.

The feed used was an Alaskan north slope diesel with the following properties:

0.56% wt Sulfur 269 ppm Nitrogen 31.1 API Gravity 13.29 % wt Aromatics

One hundred cc of catalyst was used in the microreactor with 1:1 dilution with 60/80 mesh SiC.

The operating conditions were as follows:

600 psig

1000 SCF/BBL hydrogen (35.6 Nl/hr)

2.0 space velocity

90% desulfurization

The A$_{100}$ Catalyst was activated by pressuring the reactor to 600 psig with hydrogen. Hydrogen flow was started at 1000 SCF/BBL and diesel feed brought in at 1.5 LHSV and ambient temperature. The reactor temperature was raised to 121° C. at 1.7° C./min, then increased to 343° C. at 0.56° C./min. The reactor was then cooled to the estimated start-of-run temperature of 302° C.

The COMP Catalyst was activated using the following:

a. 120 Nl/hr of a 95% H$_2$/5% H$_2$S mixture b. Ramp temperature from ambient to 204° C. at 0.56° C./min c. Hold at 204° C. for two hours d. Ramp to 316° C. at 0.55° C./min and hold for one hour e. Ramp to 371° C. at 0.55° C./min and hold for two hours f. Cool to 302° C. for feed introduction The operating procedure was as follows: At 302° C. the feed rate was increased to 2.0 LHSV and a reactor temperature profile was taken and weight periods were started when the profile was flat and at target. The reactor lined out after about 190 hours with the reactor temperature being adjusted for 500 ppm sulfur in the product. This temperature was held for the remainder of the run. Sulfur and nitrogen were analyzed by a combustion technique. Sulfur detector was UV fluorescence and nitrogen detector was chemiluminescence.

The results of these runs are shown in Tables 4 and 5 and are reported as % HDN and % HDS which is the difference in N and S in the product and feed over the N and S in the feed, expressed as a percentage.

TABLE 4

A₁₀₀ Catalyst

| Run Hrs. | Deg. C. | % HDN | % HDS |
|---|---|---|---|
| 191 | 331 | 55.0 | 90.5 |
| 216 | 329 | 53.2 | 90.3 |
| 271 | 329 |  | 89.9 |
| 287 | 330 | 52.0 | 90.3 |
| 311 | 330 | 52.4 | 90.1 |
| 335 | 330 | 52.4 | 89.7 |
| 359 | 330 | 52.4 | 89.7 |

TABLE 5

COMP CATALYST

| Run Hrs. | Deg. C. | % HDN | % HDS |
|---|---|---|---|
| 190 | 329 | 50.2 | 90.5 |
| 214 | 329 | 49.8 | 90.5 |
| 268 | 329 | 49.8 | 90.5 |
| 286 | 330 | 49.4 | 90.5 |
| 310 | 330 | 49.1 | 90.3 |
| 324 | 329 | 49.1 | 90.3 |
| 348 | 330 | 48.3 | 90.6 |

As can be seen from the above, the instant catalyst retains an improved HDN activity even over a long test term.

We claim:

1. A method of presulfurizing a sulfidable metal oxide(s)-containing catalyst which comprises:

(a) contacting said catalyst with a mixture of powdered elemental sulfur and a liquid olefinic hydrocarbon to produce a treated-catalyst; and (b) heating the treated-catalyst at an effective temperature to react the olefinic hydrocarbon and to provide a sulfurized catalyst that is more resistant to sulfur leaching than one not contacted with an olefin.

2. The method of claim 1 wherein the olefinic hydrocarbon contains olefins having carbon numbers of about 6 and greater.

3. The method of claim 2 wherein the olefinic hydrocarbon contains olefins having carbon numbers of about 8 and greater.

4. The method of claim 1 wherein the olefinic hydrocarbon contains olefins having carbon numbers ranging from about 6 to 60.

5. The method of claim 2 wherein the temperature of step (b) is greater than about 150° C.

6. The method of claim 5 wherein the time at temperature in step (b) ranges from 0.1 hours to about 10 hours.

7. The method of claim 6 wherein the catalyst contains one or more oxides of metals from Group VIB and Group VIII of the periodic Table of the Elements.

8. A method of presulfurizing a sulfidable metal oxide(s)-containing catalyst which comprises:

(a) impregnating said catalyst with elemental sulfur:

(b) subsequently or in a mixture with said elemental sulfur contacting a liquid olefinic hydrocarbon to produce sulfur-containing catalyst; and (c) heating the sulfur-containing catalyst at an effective temperature to react the olefinic hydrocarbon and to provide a sulfurized catalyst that is more resistant to sulfur leaching than one not contacted with an olefin.

9. The method of claim 8 wherein the olefinic hydrocarbon contains olefins having carbon numbers of about 6 and greater.

10. The method of claim 9 wherein the olefinic hydrocarbon contains olefins having carbon numbers of about 8 and greater.

11. The method of claim 9 wherein the olefinic hydrocarbon contains olefins having carbon numbers ranging from about 6 to 60.

12. The method of claim 9 wherein the temperature of step (b) is greater than bout 150° C.

13. The method of claim 12 wherein the time at temperature in step (b) ranges from 0.1 hours to about 10 hours.

14. The method of claim 13 wherein the catalyst contains one or more oxides of metals from Group VIB and Group VIII of the periodic Table of the Elements.

15. A presulfurized catalyst composition prepared by the process of claim 1.

16. A presulfurized catalyst composition prepared by the process of claim 2.

17. A presulfurized catalyst composition prepared by the process of claim 5.

18. A presulfurized catalyst composition prepared by the process of claim 8.

19. A presulfurized catalyst composition prepared by the process of claim 9.

20. A presulfurized catalyst composition prepared by the process of claim 12.

* * * * *